(12) United States Patent
Fries

(10) Patent No.: US 8,601,124 B2
(45) Date of Patent: Dec. 3, 2013

(54) SECURE PUBLISHING OF DATA TO DMZ USING VIRTUAL HARD DRIVES

(75) Inventor: Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1485 days.

(21) Appl. No.: 11/768,039

(22) Filed: Jun. 25, 2007

(65) Prior Publication Data

US 2008/0320127 A1    Dec. 25, 2008

(51) Int. Cl.
*G06F 15/173* (2006.01)
(52) U.S. Cl.
USPC ............ 709/225; 709/224; 370/392; 713/182
(58) Field of Classification Search
USPC .................... 709/224, 225; 370/392; 713/182
See application file for complete search history.

(56) References Cited

U.S. PATENT DOCUMENTS

| | | | |
|---|---|---|---|
| 6,324,627 B1 | 11/2001 | Kricheff et al. | 711/163 |
| 6,324,648 B1 | 11/2001 | Grantges, Jr. | 713/201 |
| 7,499,966 B2 * | 3/2009 | Elnozahy et al. | 709/203 |
| 8,184,631 B2 * | 5/2012 | Kunhappan et al. | 370/392 |
| 2003/0123483 A1 | 7/2003 | Donatelli et al. | 370/469 |
| 2005/0125529 A1 | 6/2005 | Brockway et al. | 709/224 |
| 2005/0201391 A1 | 9/2005 | Ma et al. | 370/401 |
| 2006/0031929 A1 | 2/2006 | Saito | 726/11 |
| 2006/0123472 A1 | 6/2006 | Schmidt et al. | 726/8 |
| 2006/0155667 A1 * | 7/2006 | Tolba | 707/1 |
| 2006/0200547 A1 | 9/2006 | Edwards et al. | 709/224 |
| 2007/0204166 A1 * | 8/2007 | Tome et al. | 713/182 |

FOREIGN PATENT DOCUMENTS

EP    1 324 565 A1    7/2003

OTHER PUBLICATIONS

Smoothwall Express 2.0 Installation Guide released on Dec. 8, 2003 www.smoothwall.org.*
Hosseinof, J. et al., "Secure Remote Access to Your Domino Infrastructure", Reprinted from the Jul./Aug. 2002 issue of THE VIEW, http://www.whalecommunications.com, 48-69

* cited by examiner

*Primary Examiner* — Kyung H Shin
(74) *Attorney, Agent, or Firm* — Woodcock Washburn, LLP

(57) ABSTRACT

A secure DMZ-resident computer that cannot connect to the internal network while allowing data to be transferred to and from the DMZ-resident computer is disclosed. The mechanism may include the transference of virtual hard disk files between the internal network and the DMZ host computer. The DMZ host computer may be configured with two network interface cards ("NICs"). One NIC may be connected to the DMZ network. The other NIC may be connected to the internal network. The virtual machines are connected only to the DMZ NIC. The physical host communicates only with the internal network NIC. When it is necessary to publish data to the DMZ-resident computer, a virtual hard disk file may be copied to the DMZ host over the internal network NIC. The DMZ resident virtual computer simply detects the presence of the new drive and mounts it.

20 Claims, 4 Drawing Sheets

SECURE PUBLISHING OF DATA TO DMZ USING VIRTUAL HARD DRIVES

BACKGROUND

"DMZ" is a firewall configuration for securing local area networks (LANs). Current methods for publishing data to a DMZ resident computer involve opening a port in the firewall between the DMZ computer and the internal network. This presents a security risk and is difficult and error prone to configure.

A scenario under which data must be transferred to a DMZ resident computer is the publication of data for access from the internet. A scenario under which data must be transferred from the DMZ resident computer to the internal network is retrieval of data supplied from the internet.

By making DMZ resident computers be virtual machines, they can exist with no connection to the internal network. This is very safe from a security perspective, but does not allow for data transfer between the internal network and the DMZ resident computer.

SUMMARY

The systems and methods disclosed herein provide the security of a DMZ resident computer that cannot connect to the internal network, while allowing data to be transferred to and from the DMZ resident computer. The mechanism includes the transfer of virtual hard disk files between the internal network and the host computer (i.e., the computer hosting the DMZ resident computers).

The DMZ host computer may be configured with two network interface cards (NICs). One NIC may be connected to the DMZ network. The other may be connected to the internal network. The virtual machines may be connected only to the DMZ NIC. The physical host may communicate only with the internal network NIC.

To publish data to the DMZ resident computer, a virtual hard disk file may be copied to the DMZ host over the internal network NIC. The DMZ resident virtual computer may detect the presence of the new drive and mount it. Because there is no network connection between the DMZ resident virtual computer and the internal network, the transfer can take place without any manipulation of firewalls or the like.

DETAILED DESCRIPTION

Figure 1:
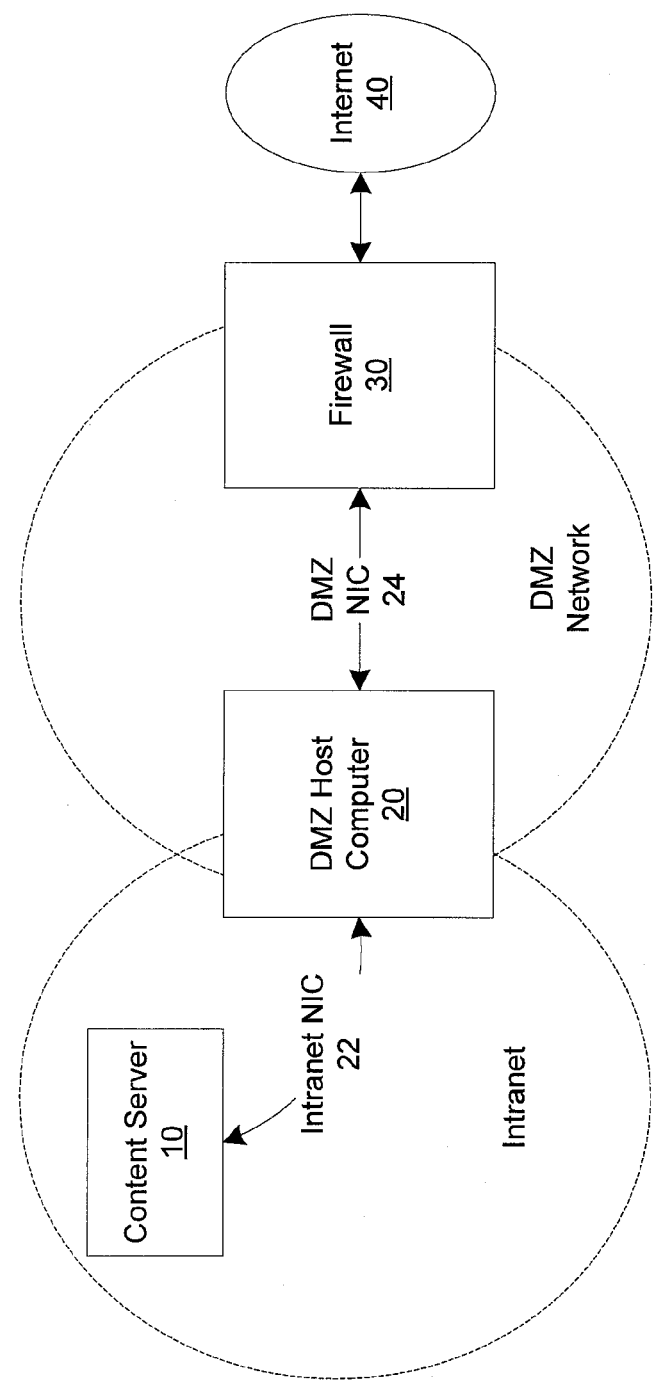
FIG. 1 is a functional block diagram illustrating a system for secure publishing of data to DMZ using virtual hard drives.

FIG. 1 is a functional block diagram illustrating a system for secure publishing of data to DMZ using virtual hard drives. As shown, such a system may include a content server 10, which may be an intranet server that is operational to communicate over a local area network, or intranet, such as a corporate network. The system may include a DMZ host server 20, which, as described in detail below, may be configured with two network interface cards (NICs). A first of the NICs may be an intranet-facing NIC, via which the host server 20 may communicate over the intranet. The second NIC may be an Internet-facing NIC. The Internet-facing NIC may enable a virtual computer running the host server 20 to communicate over the Internet 40 via a DMZ network and through a firewall 30.

Figure 2:
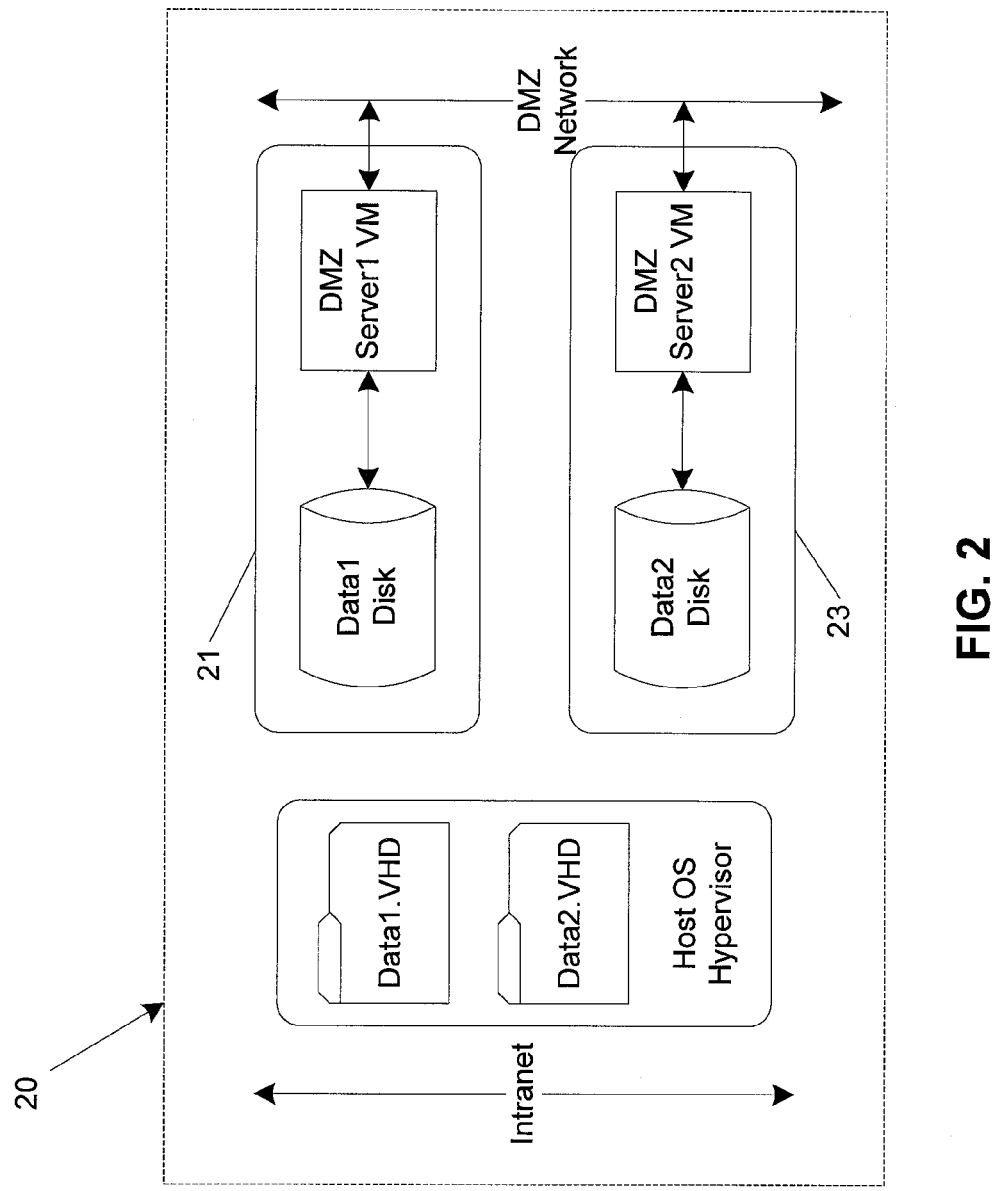
FIG. 2 is a functional block diagram of a host server.

FIG. 2 is a functional block diagram of such a host server 20. As shown, the host server 20 may host one or more virtual computers 21, 23. The virtual computers 21, 23 may be deployed on the host server 20 over the intranet-facing NIC 22. That is, the virtual computers 21, 23 may be configured to run on the host server 20, with connectivity only to the Internet 40, and with no connectivity to the intranet 10. On the other hand, the operating system running on the host server 20 may be configured to have connectivity only to the intranet 10, and not to the Internet 40. That is, the host server 20 may be configured such that its operating system is able to communicate over the intranet-facing NIC 22, but unable to communicate over the Internet-facing NIC 24. Thus, in essence, the host server 20 may be configured to act as if it were two separate and distinct computers—a first computer with access to the intranet 10, but not to the Internet 40, and a second computer with access to the Internet 40, but not to the intranet 10.

Data may be moved from the intranet 10 to the Internet 40 (i.e., "published") by transferring a data file (e.g., Data1.VHD) from the first computer to the second computer. The host server can publish data to a virtual computer 22 in the DMZ by copying a data file as a new virtual hard drive. Because the host server operating system cannot access the DMZ, the host server 20, in essence, does not exist on the DMZ side (e.g., the host computer 20 has no DNS on the DMZ side). The virtual computers 22, 24, however, exist only on the DMZ side. Consequently, such a file transfer is the virtual-machine equivalent of physically transferring a disk from a first physical computer to a second, physically-separate computer.

Figure 3:
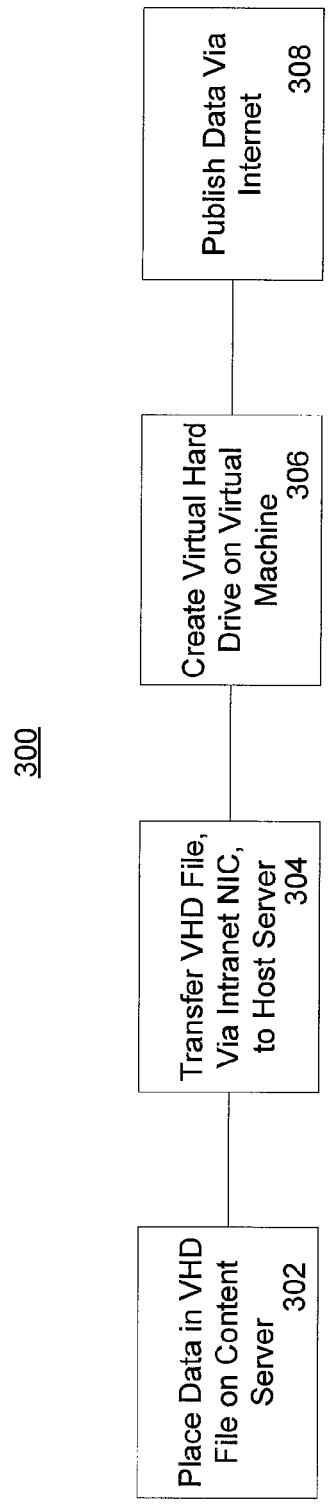
FIG. 3 is a flowchart of a method for secure publishing of data to DMZ using virtual hard drives.

FIG. 3 is a flowchart of a method 300 for secure publishing of data to DMZ using virtual hard drives. At 302, the content server 10 may create and store a data file (e.g., Data1.VHD), which may be a VHD file, for example, in memory on the content server 10. The data file may be stored on the content server's hard drive, or in virtual memory.

At 304, the data file may be transferred, via the intranet NIC, to the host server. At this point, the data file may be resident on the host server's hard drive. The host server may be blocked from transferring the data file onto the Internet because the DMZ NIC may be required for the host server to communicate via the Internet, and the host server operating system may be configured such that the host server operating system cannot access the DMZ NIC. The virtual machine may be the only software on the host server that is allowed to access the DMZ NIC. Consequently, the DMZ NIC may not be exposed to the host operating system directly, but only to the virtual computers via virtual machine hosting software (a.k.a., the "hypervisor") running on the host server.

The hypervisor can limit the virtual machines to accessing only the Internet-facing NIC. The hypervisor can also limit the devices seen by the root partition so that the root partition cannot communicate with the DMZ NIC. Another way to do this with Xen would be thru "pci device hiding." It should be understood that there may be a variety of ways in which the device isolation/access limitation can be implemented. It should also be understood that more than one virtual machine may share a single DMZ NIC, or a dedicated DMZ NIC may be desirable (or even necessary) for each virtual machine.

At 306, the content server may create a new virtual hard drive (e.g., Data1 Disk) on the virtual computer. Alternatively, a third computer (not shown) that controls the content server, e.g., a virtual machine management server ("VMMS"), for example, may create the new virtual hard drive. The content server or VMMS may make one or more application program interface ("API") calls onto the virtual machine management interface on the host server to create the new virtual hard drive. A new disk may be added on the virtual small computer system interface ("SCSI") controller on the virtual machine (e.g., VM 1). The file that contains the contents of the new disk may be Data1.VHD.

At 308, the virtual machine may publish the data to an end-user via the Internet. The virtual machine has access to the Internet via the DMZ NIC.

Such a process may also work in reverse. For example, DMZ server 2 may have a blank disk, e.g., Data2 disk. The reverse process may include attaching to DMZ server2 and collecting data to Data2 Disk. When the data is collected, the VMMS may examine the collected data, copy a VHD file from the host, extract the data, and move the data to the content server.

A system as described above can be used for analyzing the data copied onto the virtual hard drive. Such analysis may be particularly useful for virus detection on streaming data. It is well-known that virus detection on streaming data is relatively difficult compared to virus detection on file data. However, a system as described herein enables file-data antivirus analysis to be performed on streaming data. The hard disk can be brought out of the DMZ, and virus detection may be performed on the data to be sure that no virus has been carried in from the Internet before the data is copied onto the content server.

For purposes of efficiency in the publishing process, similarities between the published virtual hard disk and other files on the host computer may be exploited using remote differential compression ("RDC"). Suppose, for example, that DataDisk1 has 10 Gb of data stored thereon and DataDisk2 also has 10 Gb of data stored thereon. Typically, copying such a large amount of data would take a few minutes. If, however, there are sufficient similarities between the contents of DataDisk2 and the contents of DataDisk1, it might be desirable to construct DataDisk2 from the contents of DataDisk1, without having to copy all of DataDisk1.

RDC is a well-known algorithm that performs such a function. RDC may be employed to calculate respective signatures across the several blocks of files on DataDisk2, and to compare the calculated signatures across DataDisk1. If the two ends detect the same signature for a given block, then that block does not need to be copied. Only differing blocks could be copied, thereby significantly reducing the transfer time relative to copying all the data from DataDisk1 to DataDisk2. In the context of the current system, DataDisk2 can be copied from DataDisk1, rather than from the content sever, and then, using RDC, only those blocks are different need to be copied from the content server.

Exemplary Computing Arrangement

Figure 4:
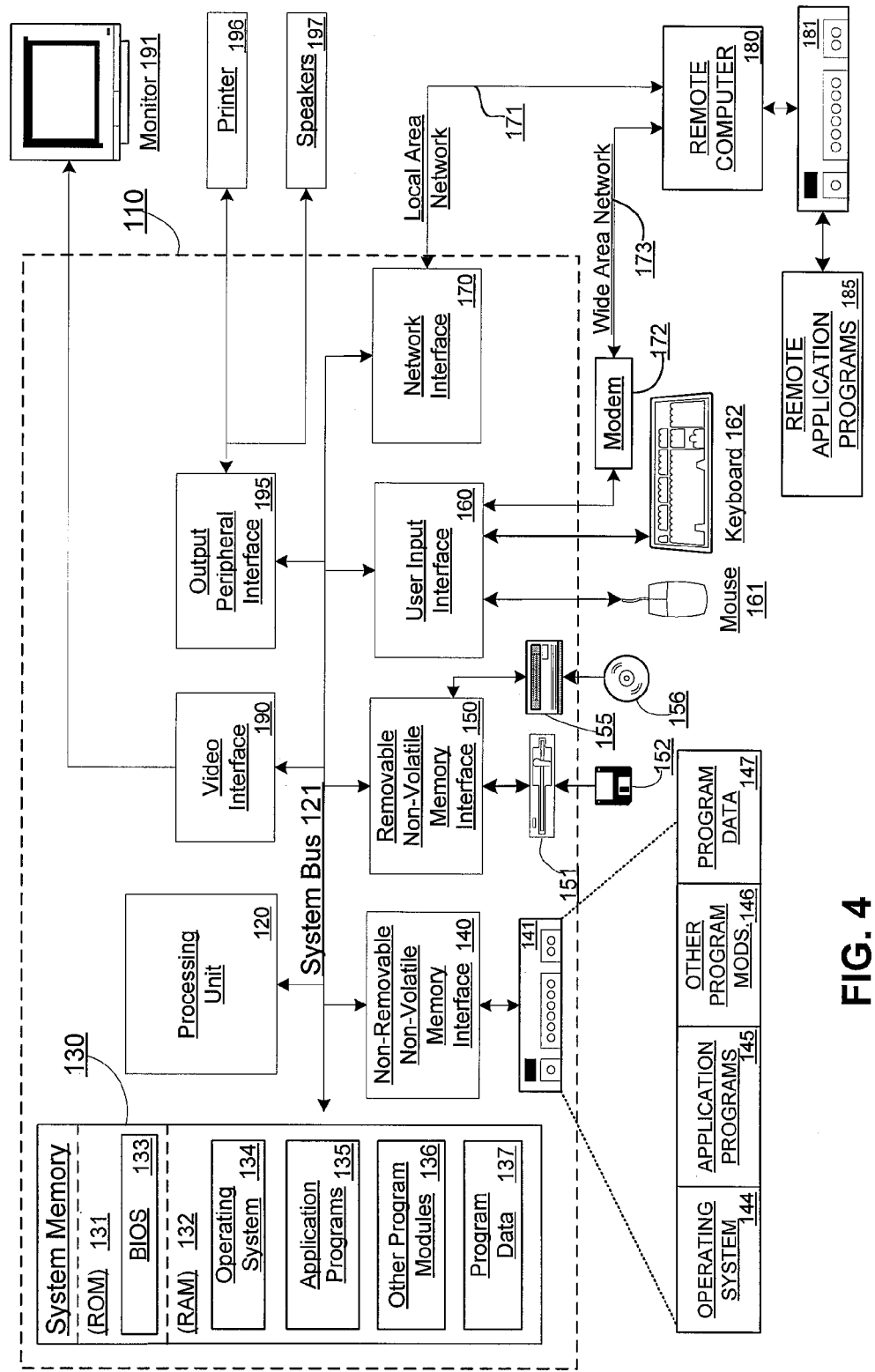
FIG. 4 is a block diagram of an example computing environment in which example embodiments and aspects may be implemented.

FIG. 4 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for secure publishing of data from a first physical computer to a DMZ resident virtual computer hosted on a second physical computer using a virtual hard disk, the method comprising:
    storing a data file in memory on the first physical computer, the first physical computer being coupled to a first network, the data file containing data;
    transferring the data to the DMZ resident virtual computer hosted on the second physical computer as a virtual hard disk on the second physical computer, via a first network interface card (NIC) coupled to the second physical computer and to the first network and not to a second network,
        the second physical computer having an operating system configured to be unable to communicate using a second NIC, and
        the DMZ resident virtual computer having a root partition configured in a manner that limits devices seen by the root partition and disables communication of the DMZ resident virtual computer with the first NIC based on the limited devices seen by the root partition;
    detecting presence of the virtual hard disk by the DMZ resident virtual computer;
    mounting of the virtual hard disk by the DMZ resident virtual computer; and
    publishing the data to the second network via the second NIC.

2. The method of claim 1, wherein the first NIC and the second NIC are installed onto a host server.

3. The method of claim 2, wherein the host server is operational to execute the virtual computer thereon, and wherein the virtual hard disk is associated with the virtual computer executing on the host server.

4. The method of claim 3, wherein the host server has an operating system that is operational to communicate onto the first network and not to communicate onto the second network, and the virtual computer is operational to communicate onto the second network, and not to communicate onto the first network.

5. The method of claim 1, further comprising creating the virtual hard disk as a new virtual hard disk on the second physical computer.

6. The method of claim 5, wherein transferring the data comprises a virtual machine management server causing the virtual hard disk to be created on the second physical computer.

7. The method of claim 6, wherein the virtual machine management server causes the new virtual hard disk to be added on a virtual SCSI controller on the second physical computer.

8. The method of claim 1, wherein the first network is an intranet.

9. The method of claim 8, wherein the second network is the Internet.

10. The method of claim 1, wherein transferring the data comprises exploiting similarities between the data and a second data file on the second physical computer.

11. The method of claim 10, wherein exploiting the similarities comprises using remote differential compression to compare signatures associated with corresponding blocks of data from the data file and the second data file.

12. A system for secure publishing of data to DMZ using a virtual hard drive, the system comprising:
   a content server in communication with an intranet; and
   a DMZ host server comprising an intranet-facing network interface card (NIC) via which the DMZ host server is enabled to communicate over the intranet with the content server, and an Internet-facing NIC via which the DMZ host server is enabled to communicate over the Internet, the DMZ host server hosting a virtual computer,
      the virtual computer having a root partition configured in a manner that limits devices seen by the root partition and disables the communication of the virtual computer with the intranet-facing NIC based on the limited devices seen by the root partition and configured to communicate over the Internet using the Internet-facing NIC,
      the virtual computer detecting presence of the virtual hard disk,
      the virtual computer mounting the virtual hard disk,
      the data published to the intranet network via the intranet-facing NIC, and
      the DMZ host server having an operating system that is configured to lack access to the Internet-facing NIC.

13. The system of claim 12, wherein the DMZ host server operating system is unable to communicate over the Internet via the Internet-facing NIC.

14. The system of claim 13, further comprising a virtual computer running on the DMZ host server, wherein the virtual computer is enabled to communicate over the Internet via the Internet-facing NIC.

15. The system of claim 14, wherein the virtual computer is unable to communicate over the intranet via the intranet-facing NIC.

16. The system of claim 15, further comprising a virtual machine management server that is adapted to create a virtual hard drive on the DMZ host server, and to cause content of a data file to be transferred from the content server onto the virtual hard drive via the intranet-facing NIC.

17. The system of claim 16, wherein the virtual computer is adapted to publish the contents of the virtual hard drive onto the Internet via the Internet-facing NIC.

18. A physical device comprising:
   a DMZ resident virtual computer hosted on the physical device;
   a processor; and
   a memory coupled to the processor, the memory having stored thereon executable instructions that when executed by the processor cause the processor to effectuate operations comprising:
      receiving data on the physical device as a virtual hard disk via a first network interface card (NIC) coupled to the physical device and to a first network and not to a second network, second physical computer having an operating system configured to be unable to communicate using a second NIC, and the virtual machine having a root partition configured in a manner that limits devices seen by the root partition and disables communication of the DMZ resident virtual computer with the first NIC based on the limited devices seen by the root partition;
      detecting presence of the virtual hard disk by the DMZ resident virtual computer;
      mounting of the virtual hard disk by the DMZ resident virtual computer; and
      publishing the data to the second network via the second NIC.

19. The physical device of claim 18, wherein the first network is an intranet.

20. The physical device of claim 18, wherein the second network is the Internet.

* * * * *